United States Patent [19]

Jaillet

[11] Patent Number: 4,667,940
[45] Date of Patent: May 26, 1987

[54] PNEUMATIC SPRING PROVIDED WITH POSITION DETECTION MEANS

[75] Inventor: André Jaillet, Auxon Dessus, France

[73] Assignee: Socalfran, Montferrand-le-Chateau, France

[21] Appl. No.: 775,236

[22] Filed: Sep. 12, 1985

[30] Foreign Application Priority Data

Sep. 28, 1984 [FR] France ................................ 84 14923

[51] Int. Cl.⁴ ........................... F16F 9/02; F16F 9/14; H01H 3/16; H01H 35/38
[52] U.S. Cl. ................... 267/64.11; 188/1.11; 200/61.44; 200/61.62; 200/82 D; 267/64.15
[58] Field of Search ........................ 188/1.11, 322.22; 267/64.11, 64.15, 64.12, 120; 364/424, 426; 200/61.44, 61.53, 61.62, 82 D, 249, 259, 245, 257, 241, 242, 52 R; 92/5 R; 91/1; 248/542, 543; 340/686

[56] References Cited

U.S. PATENT DOCUMENTS

| | | | |
|---|---|---|---|
| 1,919,206 | 7/1933 | Douglas | 188/1.11 X |
| 3,294,934 | 12/1966 | Norris et al. | 200/82 R |
| 3,659,268 | 4/1972 | Crawford | 200/61.45 R X |
| 3,812,312 | 5/1974 | Andersen et al. | 200/61.53 |
| 4,163,970 | 8/1979 | Allinquant | 340/686 |
| 4,237,353 | 12/1980 | Nemenz | 200/52 R |
| 4,263,488 | 4/1981 | Freitag et al. | 200/52 R |
| 4,316,098 | 2/1982 | Freitag et al. | 200/61.62 X |
| 4,317,014 | 2/1982 | Langanke | 200/82 D X |

FOREIGN PATENT DOCUMENTS

| | | |
|---|---|---|
| 2378987 | 1/1978 | France . |
| 2407576 | 10/1978 | France . |
| 2410349 | 11/1978 | France . |
| 2335929 | 6/1980 | France . |
| 2500964 | 2/1981 | France . |
| 37004 | 3/1982 | Japan ........................ 267/64.11 |

Primary Examiner—Andres Kashnikow
Assistant Examiner—Robert J. Oberleitner
Attorney, Agent, or Firm—Staas & Halsey

[57] ABSTRACT

A pneumatic spring is arranged with a view to putting a piece of electrical equipment into operation as soon as it reaches a given geometrical condition corresponding to a determined relative position of its piston rod, the device being equipped for this purpose with elastic strips which are arranged so as to be in contact at one time with the conducting wall of its tube, and to be separated from the latter at another time. The elastic contact strips are controlled by an insulating cam which is movable relative to them, and which is designed either to apply them against the wall of the tube if they are separated from it when at rest, or the reverse, that is to say to separate them from the wall of the tube if they are in contact with it when at rest. Such a spring can be used for automobiles.

3 Claims, 6 Drawing Figures

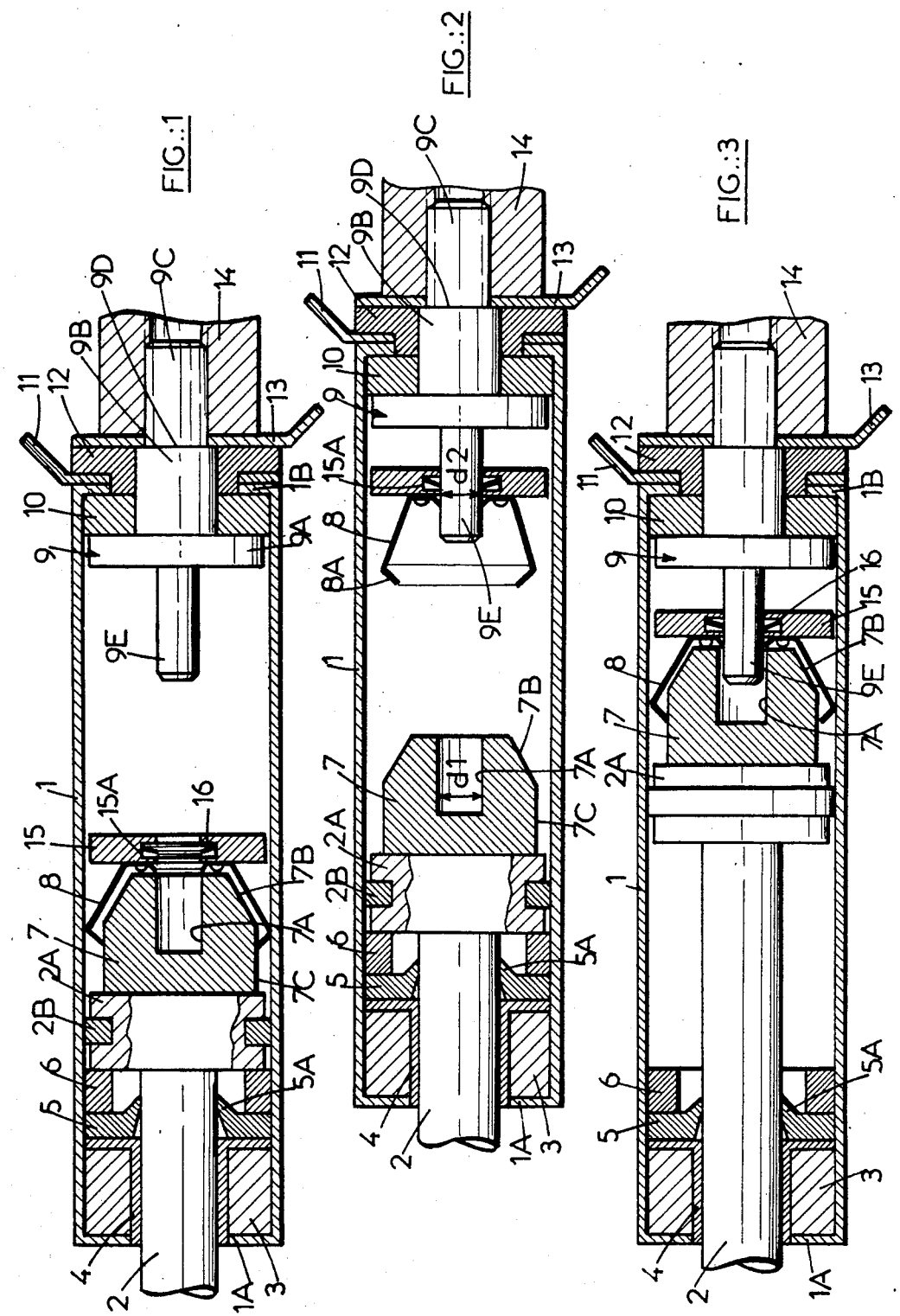

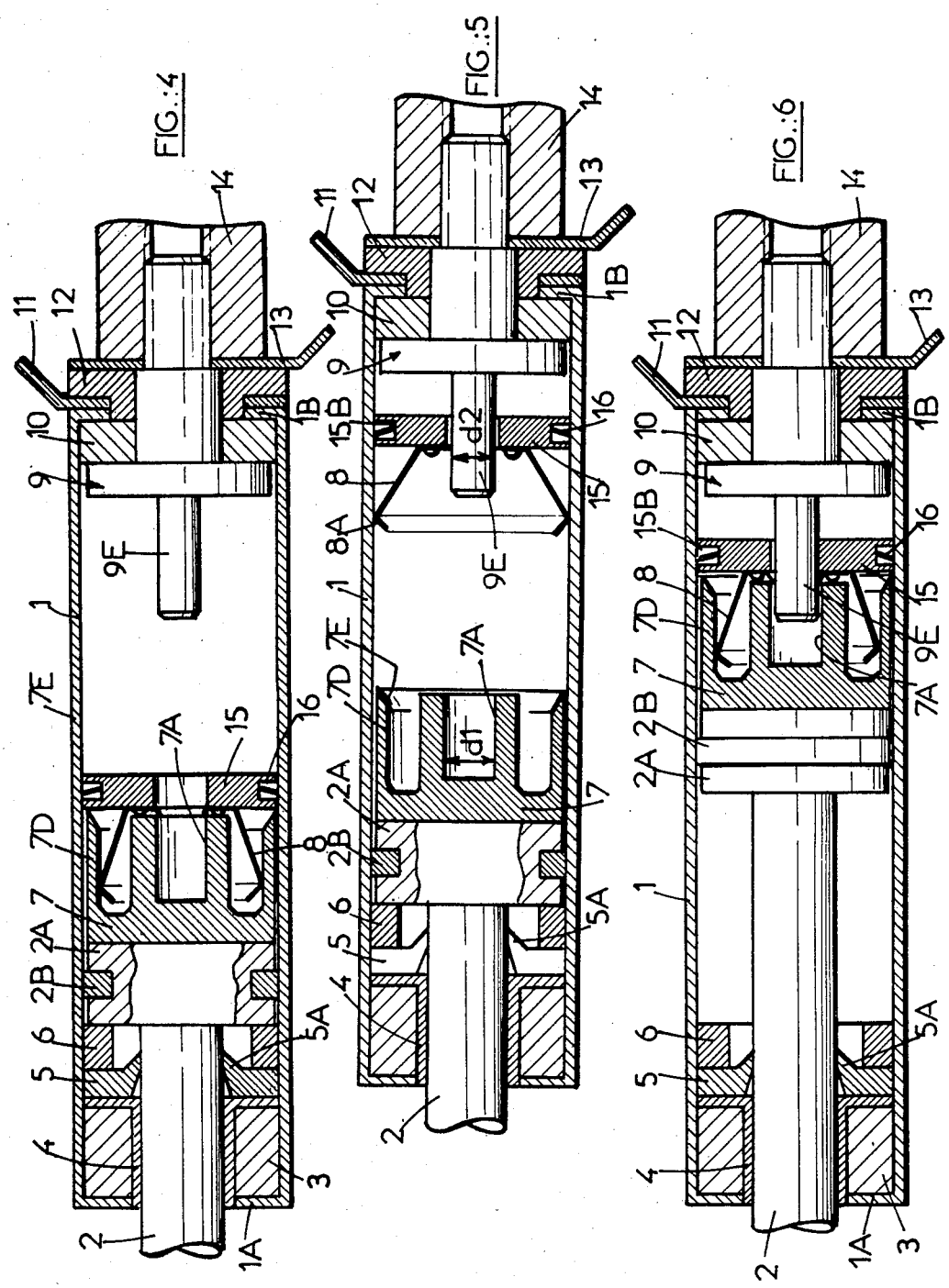

PNEUMATIC SPRING PROVIDED WITH POSITION DETECTION MEANS

FIELD OF THE INVENTION

Present invention refers to a pneumatic spring provided with position detection means.

BACKGROUND OF THE INVENTION

French Patent Application No. 2,335,929, filed on Dec. 15, 1975, describes the arrangement of a pneumatic spring, also known as a gas spring, with a view to the emission of an electrical signal as soon as a determined geometrical condition of the device is reached, in the case described the extreme "rod retracted" position, said signal being capable of engaging or disengaging an associated electrical device for indication or warning, for example. As a result, a change of condition owing to a relative movement of the rod away from the said determined position enables any undesirable movement of a component associated with the pneumatic spring to be detected, such as the rear door or the hood of a motor vehicle, or a trap-door or other hinged access door.

However, said detectable condition of the geometry of the pneumatic spring does not necessarily correspond to a single point but may extend over a certain length of its travel, as is described in French Patent Application No. 2,500,964, filed on Feb. 27, 1981, which advocates the use of elastic strips which are in contact at one time with the conducting wall of the tube of the pneumatic spring and separated from the latter at another time.

The present invention relates to a pneumatic spring of this type and the invention proposes improvements to it concerning detection of position.

SUMMARY OF THE INVENTION

In accordance with the present invention, the elastic contact strips are controlled by an insulating cam which is movable relative to them and which is designed either to apply them against the wall of the tube if they are separated from it when at rest, or the reverse, that is to say to separate them from the wall of the tube if they are in contact with it when at rest. In the first case the component forming the cam acts as a separator with respect to the strips, whereas in the second case it acts as a constrictor with respect to the latter.

According to a technical feature of the present invention, mechanical arrangements are provided for adjusting the longitudinal position of the elastic strips along the axis of the tube, thus enabling the point in the travel of the pneumatic spring where the closure or the opening of the electrical circuit should take place to be chosen at will. For this purpose the elastic strips are mounted on a movable support provided with a stop-block or other setting component fixing its position.

The present invention is suitable for various applications such as, for example: an anti-theft warning system in the case of unauthorised opening of a closed component, the illumination of an enclosure such as the trunk of a motor vehicle, the disconnection of the demisting of the rear window when the rear door is in the raised position.

BRIEF DESCRIPTION OF THE DRAWINGS

The description which follows with reference to the accompanying drawings, which is given by way of an example and is not limited thereto, shows how the invention may be constructed.

FIGS. 1, 2 and 3 are views on axial sections of an embodiment of the invention, showing it respectively in its original condition as supplied (FIG. 1), in the extended or "rod extended" position (FIG. 2) and in the retracted or "rod retracted" position (FIG. 3).

FIGS. 4, 5 and 6 are similar views of a variant of the invention, showing the three respective conditions mentioned above.

DETAILED DESCRIPTION OF THE INVENTION

The first embodiment shown in FIGS. 1, 2 and 3 incorporates a gas-tight tube made of conductive material 1 which is filled with gas under pressure suitable for its operation as a pneumatic spring. It is closed at one end by a bottom 1A through which passes in a sealed manner the rod 2 of a piston 2A with a piston ring 2B, by means of a rod guide 3 with the interposition of an insulating sleeve 4 and the addition of an annular seal 5 with a circular lip 5A which wipes the periphery of the rod 2, this seal 5 being trapped between the rod guide 3 and a locking ring 6 forming an abutment for limiting the outward stroke of the piston rod 2 out of the tube 1 (the extreme position "rod extended" is shown in FIGS. 1 and 2).

Remote from its rod 2 and thus towards the inside of the tube 1, the piston 2A is firmly fixed, according to the invention, to a cam made of insulating material 7 having firstly, a blind bore 7A of diameter d1 situated on the axis, and secondly a leading edge on its lateral surface in the shape of a ramp 7B followed by a cylindrical bearing surface 7C which is coaxial with the wall of the tube 1 but arranged to have a certain annular clearance with the latter. Within this clearance (FIG. 1) the free ends which are folded back 8A of elastic contact strips 8 are situated, which are fixed to an annular support 15 in a central space 15A of which a stop ring or block 16 is housed whose function is described below.

From the other side of the tube 1 a metal pin which is a one-piece component of revolution 9 is mounted so as to be electrically insulated, the metal pin 9 consisting of a disc 9A whose periphery is set back relative to the wall of the tube 1 and whose external surface is firmly fixed to a cylindrical body 9B extending towards the outside of the tube 1 by a threaded stud 9C forming a shoulder 9D with the body 9B. The latter passes through an annular seal 10 bearing laterally against the external surface of the disc 9A and peripherally against the wall of the tube 1, and also through an insulating plug 12 which closes an opening in the bottom 1B of the tube 1 and which separates electrically a first connection terminal 11 in contact with the tube bottom 1B from a second connection terminal 13 locked against the shoulder 9D by a nut 14 screwed onto the threaded stud 9C of the pin 9 and fixing the various components 9, 10, 11, 12, 13 to the bottom 1B of the tube 1.

On the inside, remote from its threaded stud 9C, the one-piece metal pin 9 has a cylindrical head 9E which is situated on the axis of the bore 7A of the insulating cam 7 and whose diameter d2 is smaller than the diameter d1 of the latter.

Thus, starting from the original condition shown in FIG. 1, when the pneumatic spring makes its first inward stroke of the piston rod 2 into the tube 1 (from left to right in the drawing), the annular support 15 of the elastic strips 8 is carried to the right by the insulating cam 7 with which it moves and becomes engaged around the cylindrical head 9E of the pin 9, the latter being capable of entering freely the blind bore 7A of the cam 7 (since its diameter d2 is smaller than d1) as far as the possible abutment of its free end against the bottom of the blind bore 7A. At the end of its retraction stroke (see FIG. 3), the piston rod 2 starts moving to the left in the drawing, leaving the annular support 15 in the position which it had reached on the cylindrical head 9E (see FIG. 2), the stopblock 16 being designed to allow the support 15 to move from left to right along the head 9E, but to prevent by gripping the latter any movement in the opposite direction, that is to say from right to left.

For reasons of simplicity, the drawings do not show the associated mechanical and electrical arrangements of the pneumatic spring which are conventional. The device is intended to be mounted in the usual manner:

the piston rod 2, by its outer end (farthest left), and the locking nut, by its outer end (farthest right), are coupled respectively to components of a structure which are movable relative to one another and which the pneumatic spring must push open, for example the rear door or the hood of a motor vehicle and its body, a door and its door frame, the electrical circuit to be controlled by the pneumatic spring operating as a switch is connected to terminals 11 and 13, as shown diagrammatically in the French Patents mentioned above.

The device described above operates in the following manner:

In its "rod extended" condition as shown in FIG. 2, the elastic strips 8 are in the rest position, separated from the wall of the tube 1 and thus not in contact with it. The external electrical circuit connected to terminals 11 and 13 is thus open.

At a certain point on the retraction stroke of the piston rod 2 into the tube 1, a point which is determined by the position of the annular support 15, the insulating cam 7 which is firmly fixed to the piston 2A reaches a position in line with the free ends which are folded back 8A of the elastic strips 8, and by the action upon the latter of its leading edge forming a ramp 7B, it separates the strips and applies them against the wall of the tube 1, thus establishing instantaneous contact with it. The external electrical circuit connected to terminals 11 and 13 is thus closed. This condition is maintained up to the end of the inward stroke (see FIG. 3).

If for one reason or another the inward stroke of the piston rod 2 continued further, the support 15 of the strips 8 would shift to the right by that amount and would remain there owing to the locking exerted by the stopblock 16 upon the head 9E.

It is not essential that the latter is positioned centrally, as shown, upon the support 15 and grips the surface of the head of the pin 9E. It could equally well be positioned peripherally and grip against the wall of the tube 1, as in the variant of construction shown in FIGS. 4, 5 and 6. It incorporates in fact an annular stopblock 16 but of larger diameter and housed in this case in a space 15B arranged at the periphery of the support 15 of the elastic strips 8.

It will also be noted that in this variant of construction, these strips are in contact with the wall of the tube 1 when at rest (see FIG. 5), the external electrical circuit connected to terminals 11 and 13 then being closed. To open the circuit, it is necessary to bend the strips 8 towards the axis in order to separate them from the wall of the tube 1.

The insulating cam 7 is shaped for this purpose as a constrictor owing to a bush 7D whose leading edge is tapered forming a wedge 7E which becomes inserted between the wall of the tube 1 and the free ends 8A of the elastic strips 8 (see FIG. 6).

Apart from these technical features affecting the peripheral arrangement of the annular stopblock 16 on the support 15 and the configuration of the insulating cam 7 as a constrictor for the elastic strips 8 which are in contact with the tube 1 when at rest, the variant shown in FIGS. 4, 5 and 6 operates in exactly the same fashion as that described relating to FIGS. 1, 2 and 3, and it is therefore unnecessary to repeat the explanation, particularly as the same reference numbers are used to designate the same components.

It goes without saying that the embodiments described are only examples to which modifications may be carried out, particularly by the substitution of equivalent techniques, without departing from the framework of the invention.

I claim:

1. A pneumatic spring, comprising:
   a tube of conductive material, which is connectable to electrical equipment;
   a piston provided with a piston rod and movable inside said tube;
   elastic strips, of conductive material, which are connectable to said electrical equipment, said elastic strips being mounted inside said tube on a movable support which can be displaced in one direction along said tube by said piston, and having a locking component fixing the position of the movable support; and
   an insulating cam, which can move with said piston and is able to engage said elastic strips and to move said elastic strips between a position where said elastic strips are in contact with said tube, and a position where said elastic strips are separated from said tube, thereby changing the electrical condition of an electrical circuit including said tube and said elastic strips.

2. A pneumatic spring according to claim 1, wherein said locking component comprises a stopblock housed in a central space arranged in the support, which is annular so as to be entered by a cylindrical head of a fixed pin, said stopblock being designed to allow movement of the support along said head in the one direction but to prevent any relative movement in the opposite direction.

3. A pneumatic spring according to claim 1, wherein said locking component comprises a stopblock housed in a peripheral space arranged in the support and is designed to allow movement of the latter along said tube in the one direction but to prevent any relative movement in the opposite direction, by gripping the wall of said tube.

* * * * *